United States Patent Office 3,355,876
Patented Dec. 5, 1967

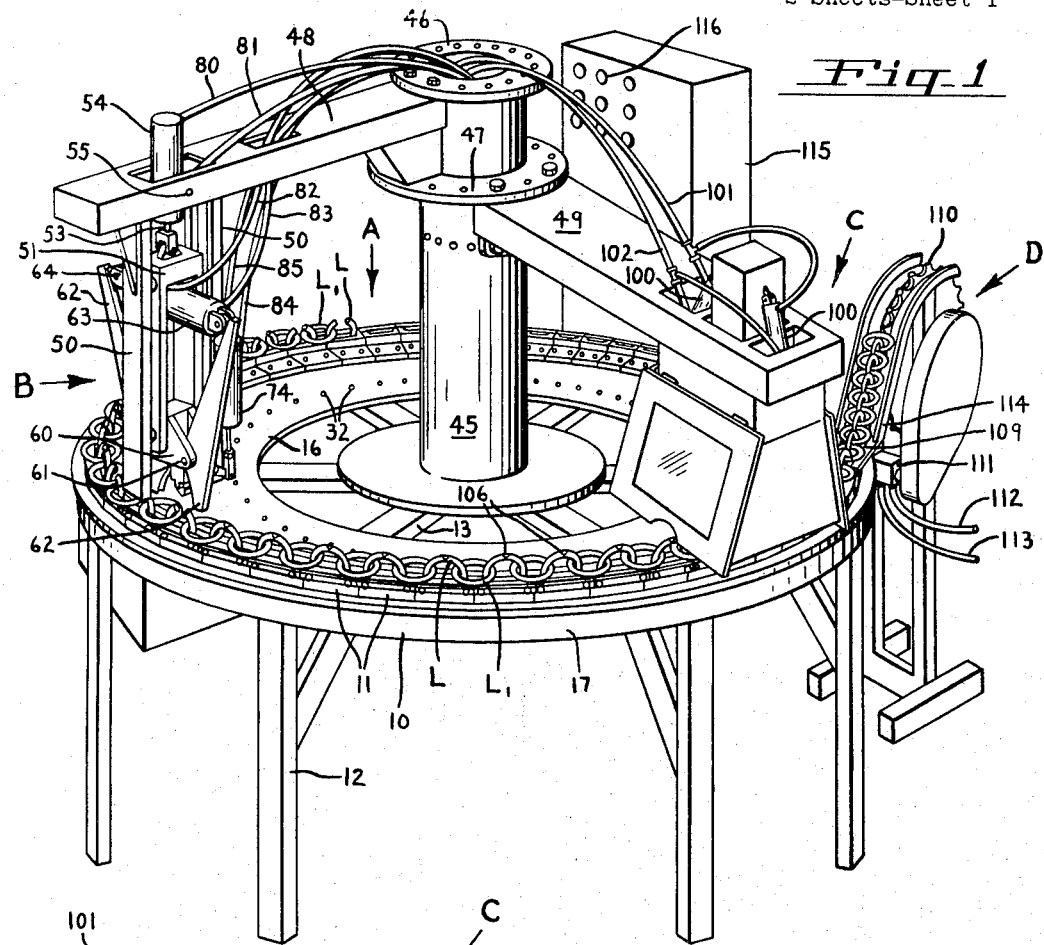
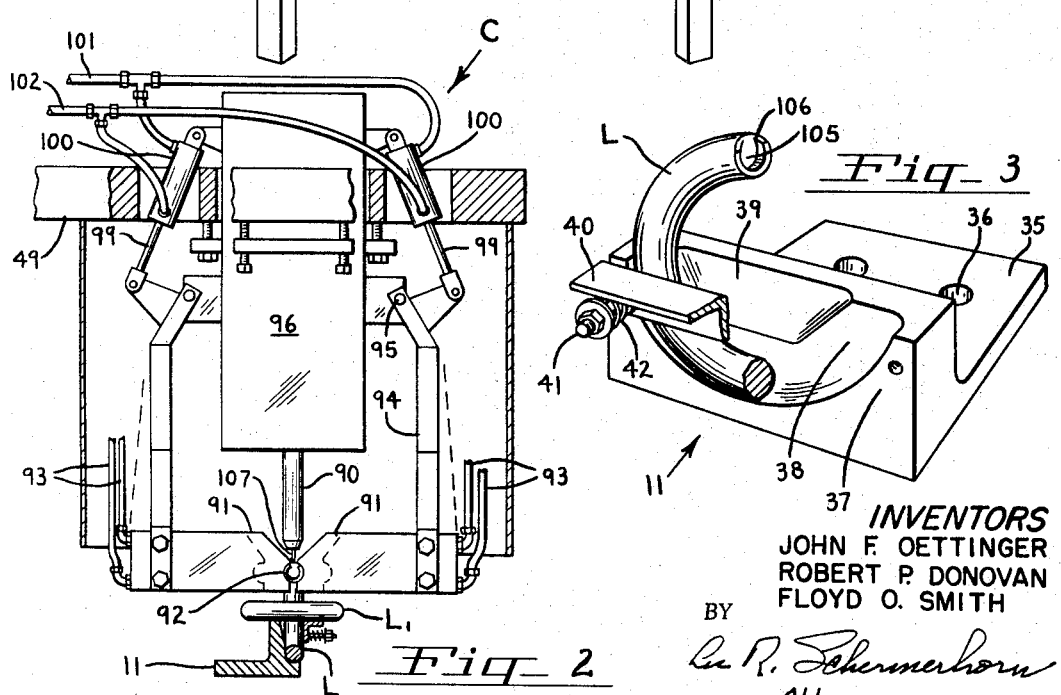

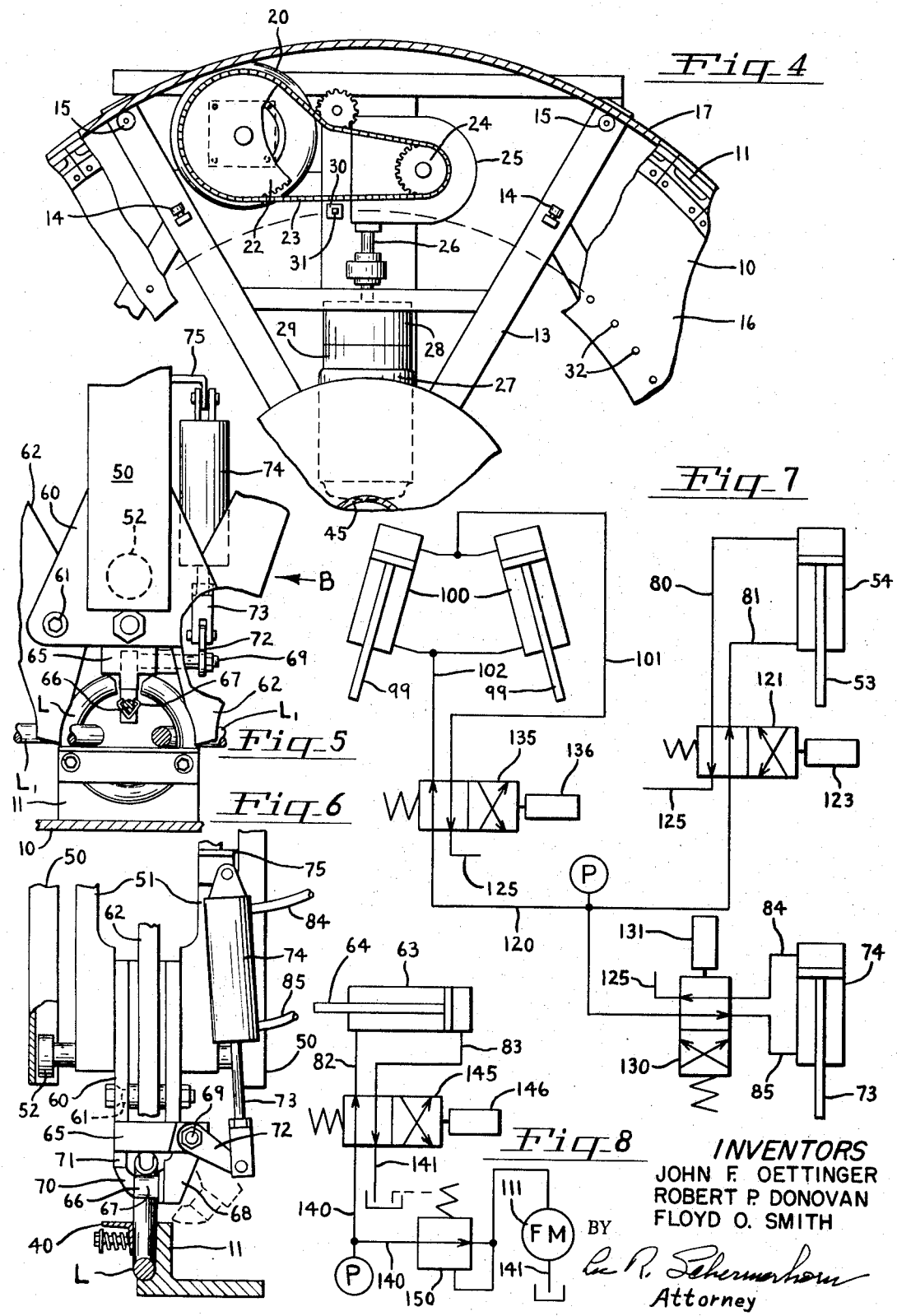

3,355,876
CHAIN MAKING MACHINE
John F. Oettinger, Portland, Oreg., Robert P. Donovan, Danville, Ill., and Floyd O. Smith, Portland, Oreg., assignors to Esco Corporation, Portland, Oreg., a corporation of Oregon
Filed Jan. 22, 1965, Ser. No. 427,388
17 Claims. (Cl. 59—22)

ABSTRACT OF THE DISCLOSURE

A turntable having clamping link holders to hold open links associated with closed links in a chain. A central stationary column has a pair of radial gantry arms overhanging the link holders. One gantry arm carries a link press for closing the open links and the other gantry arm carries a welding machine for welding the pressed links. Offbearing means strip the welded links from the holders as the turntable rotates in step-by-step movement.

---

This invention relates to a machine for making chains.

Objects of the invention are to provide a machine for making chain, to provide a machine for closing and welding open links which have previously been assembled with preformed closed links, to provide a machine having a means of moving the links successively through a pressing station and a welding station, to provide a novel turntable construction, to provide novel and improved pressing apparatus for closing the open links, to provide an improved end shape on the open links to facilitate the making of a strong welded joint, and to provide an improved method of welding for such links.

The present machine has a rotary turntable on which open links may be assembled with closed links. The assembled links first pass through a press station having press mechanism arranged to close the open links. The links then progress to a welding station where the ends of the pressed links are welded together. The table is rotated in step-by-step movement, each time the table stops one open link being closed by the press mechanism and one pressed link being welded by the welding mechanism. These operations are controlled by solenoids which are actuated in timed relation so that the machine will operate automatically. The only manual function involves the placing of the closed and open links on the turntable ahead of the press mechanism. Offbearing means are provided to remove the completed chain from the table.

The invention will be better understood and the foregoing and other objects and advantages will become apparent from the following description of the preferred embodiment illustrated on the accompanying drawings. Various changes may be made, however, in the details of construction and arrangement of parts and certain features may be used without others. All such modifications within the scope of the appended claims are included in the invention.

In the drawings:

FIGURE 1 is a perspective view of a chain making machine embodying the features of the invention;

FIGURE 2 is a vertical sectional view through the welding mechanism shown in FIGURE 1;

FIGURE 3 is an enlarged perspective view, with parts broken away, showing a link holder on the rotary table;

FIGURE 4 is a fragmentary top plan view, with parts broken away, showing the drive mechanism for the rotary table;

FIGURE 5 is an enlarged fragmentary view of the press mechanism;

FIGURE 6 is a fragmentary view of the press mechanism at right angles to FIGURE 5;

FIGURE 7 is a pneumatic circuit diagram for the machine; and

FIGURE 8 is a hydraulic circuit diagram for the machine.

In FIGURE 1, a circular table 10 having link holders 11 is mounted for counterclockwise rotation on a base frame 12. At an assembly station A, open links L are mounted in vertical positions in holders 11 and closed links $L_1$ are placed in horizontal positions interconnecting the open links as shown. The open links have gaps just wide enough to receive the closed links. The table rotates in step-by-step movement carrying the assembled open and closed links to a press station B where each open link is closed by a press mechanism which may also be designated generally as B. Then the links progress to a welding station C where the ends of the previously open links are welded together. The welding mechanism may also be designated generally as C. Following the welding operation, the completed chain is removed from the table at an offbearing station D and the offbearing mechanism may likewise be designated generally as D.

FIGURE 4 illustrates the drive mechanism for the table 10. The base frame 12 has a plurality of horizontal, radial arms 13 equipped with horizontal rollers 14 and vertical rollers 15 to support and guide the turntable 10. The turntable has a horizontal annular deck portion 16 resting on the rollers 14 and a peripheral vertical rim or skirt portion 17 engaging the rollers 15.

Vertical rim portion 17 is frictionally driven by a wheel 20 having a pneumatic tire which engages the inside surface of the rim. Wheel 20 is driven by a sprocket 22 and chain 23 from a sprocket 24 on a speed reducing mechanism 25. The speed reducing mechanism has a power input shaft 26 driven by an electric motor 27.

In order to index the table accurately after each increment of movement, the drive train includes an electrically actuated brake 28 and an electrically actuated clutch 29. The table is indexed to a plurality of different rest positions by a switch 30 which controls the brake and clutch. Switch 30 has a vertical actuating finger 31 underneath the table arranged for engagement by the lower ends of lugs 32 in deck portion 16. There is a lug 32 corresponding to the position of each link holder 11. The motor 27 runs continuously while the machine is operating. Whenever a lug engages the switch finger, the clutch is disengaged and the brake is actuated. When the pressing and welding mechanisms have operated, the brake is released and the clutch re-engaged.

The structure of link holders 11 is shown in FIGURE 3. Each link holder comprises a flat base portion 35 having holes 36 for bolting the holders end to end on the periphery of the deck surface 16 of the rotary table 10. An upstanding end flange portion 37 has a curved groove 38 in its outer face shaped to fit and receive the lower half of an open link L in vertical position. There is also a deeper guide recess 39 of less vertical and horizontal extent than the groove 38. The link is firmly clamped in groove 38 by an angle plate 40 having a flat top surface in the plane of the top of the upstanding portion 37. The vertical web of angle plate 40 has apertured ends supported on horizontal studs 41 in the ends of portion 37. These studs carry compression springs 42 which press plate 40 toward the portion 37.

Thus, a link L may be freely inserted into the recess 39 and then forcibly pressed downward into the groove 38 causing the clamp plate 40 to yield outward against the force of springs 42. The links are seated in the bottoms of grooves 38 with the open sides suppermost as shown. After each open link L is placed in a holder 11, a closed link $L_1$ is inserted through its opening and laid on the horizontal supporting surface provided by the top flange web of clamp plate 40 and the top of upstanding portion 37 so that the closed link lies in horizontal position. The next open link L is then linked with the closed link as it is placed in the next holder 11. This placement of open and closed links results in the assemblage of links appearing at station A in FIGURE 1.

In FIGURE 1, the radial arms 13 of base frame 12 support a hollow central vertical column 45 which carries the press unit B and welding unit C. For this purpose the upper end of the column is equipped with an upper radial flange 46 and a lower radial flange 47. Connected to these flanges are stationary radial gantry arms 48 and 49 overhanging rotary table 10 and link holders 11, the arm 48 carrying the press unit and the arm 49 carrying the welding unit.

Depending from the outer end of gantry arm 48 is a pair of vertical guide channels 50 for a vertically slidable press frame 51 of inverted U-shape. Channels 50 provide guide tracks for rollers 52 on the frame 51 as shown in FIGURE 6. Frame 51 is raised and lowered by a piston rod 53 in a cylinder 54 which is supported by pins 55 in the gantry arm 48.

Secured between the lower end of the legs of frame 51 is a member 60 having oppositely directed outstanding ears supporting horizontal pins 61. Pivotally mounted on pins 61 is a pair of jaw members 62 arranged like pliers to engage the opposite sides of open links L and squeeze them together. The upper ends of the jaws are interconnected by a cylinder 63 and piston rod 64 which exerts the squeezing force. During the squeezing movement, the ends of the link are prevented from deflecting upward by a wear plate 65 on the under side of member 60 as shown in FIGURES 5 and 6.

Prior to the pressing or squeezing operation, the link, which in the present case is circular, is rotated in groove 38 as may be necessary to place the gap in the link accurately in top center position. This is accomplished by a link positioner 66 which passes downward through the gap between the ends of the link when the frame 41 is lowered for pressing. The positioner 66 is preferably equipped with a V-shaped spring member 67 which is slightly wider than the gap so as to engage both ends of the link and be slightly compressed thereby as it passes through the gap.

Link position 66 is mounted on an arm 68 on a shaft 69 which is mounted for rotation on an extension of the wear plate 65. Link positioner 66 has a nose portion 70 which engages a stop 71 on one end of wear plate 65 to prevent rotation of the link positioner as it is being forced through the gap in the link. After the link positioner has passed through the gap as shown in FIGURES 5 and 6, it may be retracted by an arm 72 on the shaft 69 to its broken line position in FIGURE 6. Arm 72 is connected with a piston rod 73 in a cylinder 74. The upper end of cylinder 74 is connected to a bracket 75 on the frame 51.

In each cycle of operation the press frame 51 is lowered by piston rod 53 causing link positioner 66 to pass through the gap in an open link L and rotate the link as may be necessary to place this gap in precise top center position. Wear plate 65 engages the upper side of the link as shown in FIGURE 5 and continues to exert downward pressure on the link by the action of cylinder 54. Link positioner 66 is then withdrawn by piston rod 73 and the press jaws 62 are actuated by cylinder 63 to close the link. Then the jaws 62 are retracted and the frame 51 is raised by cylinder 54 in preparation for another incremental rotation of the table 10 to bring the next open link L into pressing position.

As seen in FIGURE 1, the double acting cylinders 54, 63 and 74 are supplied by the flexible hose conduits 80, 81, 82, 83, 84 and 85, respectively. These conduits are trained along the gantry arm 48 and down through the hollow column 45 to suitable control valves which will presently be described.

The welding unit C on gantry arm 49 is shown in FIGURE 2. This mechanism comprises essentially an electrode assembly 90 and a pair of retractable water-cooled copper molds 91 having approximately semi-cylindrical grooves 92 to clamp and substantially enclose the joint in the upper side of each open link L which has been closed by the press unit. These molds are connected with cooling water conduits 93. Each mold is carried by a supporting arm 94 which is pivotally mounted at 95 on a supporting frame 96 on the arm 49. The molds may be moved to clamped and retracted positions by piston rods 99 in a pair of double acting cylinders 100. These cylinders are supplied by fluid pressure conduits 101 and 102 which are trained along gantry arm 49 to the upper end of hollow column 45.

The ends of the open links L are preferably cast in the shape shown in FIGURE 3 to provide in each end a recess or half cup pocket 105 to receive weld metal. The upper edge is bevelled at 106 which provides a top opening into the complete cup when these link ends are pressed together. The mold grooves 92 leave a top opening which communicates with the opening 106 and the electrode assembly 90 is equipped with a vertical consumable electrode arranged to strike an arc to the link and deposit weld metal into the cup 105 to unite the ends of the link, as shown in FIGURE 2.

Preferably, the welding operation is performed in three stages. When a link L arrives at the welding station, the two molds 91 come together and clamp the joint as described and then the electrode 107 in electrode assembly 90 strikes an arc and deposits a small quantity of weld metal in the bottom of cup 105. The arc is then extinguished to allow the deposited metal to solidify in the bottom of the cup. Then the arc is struck again and more weld metal is deposited substantially filling the cup 105. Again the arc is extinguished and the newly deposited metal is allowed to solidify. This is accomplished quickly because heat is removed rapidly by water circulating through the water tubes 93. As it solidifies, the weld metal shrinks forming a depression in its top surface. Finally, the arc is struck a third time and a third deposition of weld metal fills the cup as well as the depression formed by the bevelled edges 106 to build up the weld section to the full thickness of the link.

After the arc has been extinguished the third time, the molds 91 remain in position long enough for the last deposited metal to solidify and then the molds are retracted to their broken line positions by cylinders 100. The whole welding operation requires but a fraction of a minute and then the table 10 rotates another link L into welding position. While each welding operation is being performed, one of the open links L is being closed by the press mechanism previously described at press station B.

During each incremental rotation of turntable 10, a pair of links is removed from the turntable by offbearing sprocket wheel 110 in FIGURE 1. This sprocket wheel is under constant torque by a rotary hydraulic motor 111. Motor 111 is continuously supplied by hydraulic conduits 112 and 113. Between offbearing sprocket wheel 110 and the chain holders 11 on turntable 10 there is arranged an inclined chain trough 114 having a slot 109 in its lower end. This slotted lower end of the trough passes under the horizontal links $L_1$ straddling vertical links L and the inclination of the trough raises the horizontal links as they advance, causing the vertical links L to be stripped from the holders 11 and pass up the trough. Sprocket wheel 110 maintains constant tension on the horizontal links to pull chain from the table each time it rotates.

Adjacent the turntable is a console cabinet 115 having various controls 116 for adjusting the timing intervals and other variables of the various functions performed by the machine. The cabinet contains a suitable timing device and an electrical control system actuating solenoid valves for the control of the pneumatic and hydraulic circuits which actuate the operating devices described. The fluid pressure conduits 80 to 85, 101 and 102 lead to cabinet 115 from the lower end of column 45.

The pneumatic circuit diagram for the machine is shown in FIGURE 7. This circuit is energized from a pressure line 120. Press raising and lowering cylinder 54 is controlled by a solenoid valve 121 having an actuating solenoid 123. This is a two position valve with spring return. An exhaust connection for the valve is shown at 125. When solenoid 123 is deenergized, piston rod 53 is normally raised as shown. When solenoid 123 is energized, piston rod 53 is lowered.

Cylinder 74 is controlled by a solenoid valve 130 having a solenoid 131 with spring return. When the solenoid is deenergized, piston rod 73 is retracted and when the solenoid is energized, the piston rod is moved downward.

Mold retracting cylinders 100 are controlled by a solenoid valve 135 having a solenoid 136 and spring return. When the solenoid is deenergized, the piston rods 99 are raised as shown and the molds 91 retracted. When the solenoid is energized, the piston rods are lowered and the molds are moved to clamping position.

The hydraulic circuit diagram is shown in FIGURE 8. This system is energized from a pressure line 140 and the system includes relief lines 141. Link press cylinder 63 is controlled by a solenoid valve 145 having a solenoid 146 and spring return. When the solenoid is deenergized, the piston rod 64 is retracted as shown and when the solenoid is energized, the piston rod is extended to operate press jaws 62.

Offbearing feed motor 111 is energized continuously through a reducing valve 150 but can operate only when the table 10 rotates to feed chain.

The above-mentioned solenoids are energized and deenergized at the proper times by limit switches and other means in an electrical system which is not illustrated. The sequence of functions of the machine has been fully described and it is believed that the details of the electrical system are not necessary to an understanding of the claimed features of the invention by persons skilled in the art. Also, it will be appreciated that the controls 116 in FIGURE 1 include manual switches for energizing and deenergizing the various solenoids individually so that the various machine functions can be initiated manually one after another when desired. Manual control of the solenoids is often desirable for test purposes and for making adjustments.

When the machine is in full automatic operation, the welding unit controls the feed movements of the turntable since the welding operation requires more time than the link press operation. The link press and welding operations are performed simultaneously, the pressing operation ordinarily being completed first. When the welding operation is completed on a link, the turntable clutch 29 is engaged and brake 28 released to produce an incremental movement of turntable 10 equal to the distance between the centers of link holders 11. As the turntable rotates, the offbearing sprocket wheel 110 removes two links of the completed chain through the inclined trough 114. As previously described, this table movement is stopped by actuation of switch 30 in FIGURE 4 by the next lug 32 on the turntable. When movement of the turntable is stopped, pressing and welding operations are initiated on different links as above described. The operation of link positioner 66 in link press B insures that cup 105 in each link L will be in proper position for register with the welding electrode when the links reach the welding unit C.

Thus, in fully automatic operation, the only manual function is to place open links L in the holders 11 in association with the closed links $L_1$ at assembly station A. Assembly station A may extend from press station B around to offbearing station D over a distance exceeding half the circumference of the turntable whereby the operator may normally maintain a considerable quantity of assembled links on the turntable. This allows him considerable time for other duties such as observing the operation of the pressing and welding mechanisms and inspecting the completed chain. The control system also allows for manual interruption of the automatic cycling and re-welding in case of defective welds and includes various safety devices to prevent recycling of certain operations in such event. These and other such refinements are not illustrated since they are not essential to an understanding of the principal features of the invention.

Having now described our invention and in what manner the same may be used, what we claim as new and desire to protect by Letters Patent is:

1. A chain making machine comprising an assembling station where closed links amy be assembled on open links, a pressing station having means to press said open links closed, a welding station having means to weld said pressed links, a series of link holders for holding said open links, and means to move said link holders in step-by-step movement from said assembling station to said pressing station and thence to said welding station.

2. A machine as defined in claim 1 including a turntable supporting said link holders.

3. A machine as defined in claim 2 including a link positioner for orienting said open links in said holders to predetermined positions for welding.

4. A machine as defined in claim 3, said link positioner being operable by said link press.

5. A machine as defined in claim 2, including offbearing means for removing welded chain from said turntable, and drive means for said offbearing means.

6. A machine as defined in claim 5, said offbearing means comprising a sprocket wheel, and a trough between said sprocket wheel and turntable arranged to strip said open links from said holders when the turntable rotates.

7. A machine as defined in claim 2 including a base frame supporting said turntable, a column on said base frame at the center of said turntable, and gantry arms on said column supporting said press means and said welding means over said link holders.

8. A machine as defined in claim 7 including means for raising and lowering said press means.

9. A machine as defined in claim 7 including retractable mold members in said welding means arranged to clamp said open links, cooling means for said mold members, and an electrode in said welding means arranged to strike an arc to said open links.

10. A chain making machine comprising a series of clamping link holders for holding open links associated with alternate closed links in a chain, a link press for closing said open links, a welding machine for welding the pressed links, means for advancing said link holders through said link press and said welding machine, and offbearing means arranged to strip the welded links from said holders.

11. A chain making machine comprising a base frame, a turntable on said base frame, link holders on said turntable, a column on said base frame at the center of said turntable, a pair of gantry arms on said column, a link press on one of said arms overhanging said holders, and a welding unit on the other arm overhanging said holders.

12. A chain making machine comprising a base frame, a turntable on said base frame, means for rotating said turntable in step-by-step movement, link holders on said turntable, a column on said base frame at the center of said turntable, a pair of gantry arms on said column, a link press on one of said arms overhanging said holders, means for raising and lowering said press, a welding unit on the other arm overhanging said holders, retractable mold members in said welding unit arranged to clamp a link in one of said holders, means for cooling said mold members, an electrode in said welding unit arranged to strike an arc to said link, and offbearing means arranged to remove welded chain from said holders.

13. In a chain making machine, a series of link holders, each link holder having a vertical flange with a groove to fit one side of the lower portion of a chain link in vertical position, a spring pressed clamp plate on said flange arranged to clamp a link in said groove, and top surfaces on said flange and clamp plate arranged to support other links in horizontal position interconnecting the vertical links in adjacent holders.

14. In a chain making machine, a link press comprising vertical guide means, a press frame mounted for vertical movement in said guide means, a cylinder for raising and lowering said frame, a pair of press jaws in said frame, a cylinder arranged to operate said jaws, and a wear plate on said frame between said jaws arranged to bear down on a chain link while the link is being pressed by said jaws.

15. In a link press as defined in claim 14, a link positioner comprising an arm pivotally mounted on said press frame to extend transversely of said jaws beneath said wear plate for passing through the gap in an open link when said press frame is lowered, and means for retracting said arm through the link to permit the press frame to be raised after the link has been pressed closed.

16. In a chain making machine, a turntable, a series of link holders mounted around the periphery of said turntable and arranged to clamp alternate links to a chain in vertical positions, an offbearing sprocket wheel arranged to tension the chain leaving said turntable, and a chain trough from said sprocket wheel to said turntable, said trough having a slotted end arranged to straddle said vertical links underneath interconnecting horizontal links and strip said vertical links from said holders when the turntable rotates.

17. The method of making a chain link comprising forming an open link with recessed end portions which form an open top cup-shaped pocket when said end portions are pressed together, pressing said end portions together to close the link and form said pocket, depositing a small quantity of weld metal in the bottom of said pocket and allowing said metal to solidify and unite said end portions, depositing more weld metal to substantially fill said pocket, allowing said last weld metal to solidify and shrink, and then depositing enough weld metal to completely fill said pocket, including said shrinkage space, and allowing said last weld metal to solidify.

References Cited

UNITED STATES PATENTS

| | | | |
|---|---|---|---|
| 699,760 | 5/1902 | Judson | 59—1 |
| 1,186,927 | 6/1916 | Merritt | 59—1 |
| 1,430,456 | 9/1922 | Lyter | 59—22 |
| 1,510,197 | 9/1924 | Ryan | 219—51 |
| 1,670,758 | 5/1928 | Witherow | 59—35 |
| 2,242,164 | 5/1941 | Barstow | 59—31 |
| 2,242,502 | 5/1941 | Bangs | 59—35 |
| 2,257,509 | 9/1941 | Morrow | 59—1 |
| 2,260,630 | 10/1941 | McKinnon | 59—35 |
| 2,439,522 | 4/1948 | Miller | 59—35 |

FOREIGN PATENTS

| | | |
|---|---|---|
| 1,340,047 | 9/1963 | France. |
| 564,231 | 9/1944 | Great Britain. |
| 738,465 | 10/1955 | Great Britain. |

CHARLES W. LANHAM, *Primary Examiner.*

G. P. CROSBY, *Assistant Examiner.*